United States Patent [19]

Noe

[11] 4,387,800
[45] Jun. 14, 1983

[54] WALKING-BEAM CONVEYOR

[75] Inventor: Oskar Noe, Mühlheim am Ruhr, Fed. Rep. of Germany

[73] Assignee: BWG Bergwerk- Und Walzwerk-Maschinenbau GmbH, Duisburg, Fed. Rep. of Germany

[21] Appl. No.: 197,168

[22] Filed: Oct. 15, 1980

[30] Foreign Application Priority Data

Apr. 26, 1980 [DE] Fed. Rep. of Germany ....... 3016158

[51] Int. Cl.$^3$ ............................................ B65G 23/00
[52] U.S. Cl. ..................................... 198/750; 198/774
[58] Field of Search ............... 198/487, 614, 774–776, 198/737, 740, 750

[56] References Cited

U.S. PATENT DOCUMENTS 3,128,873  4/1964  McCain et al. ................... 198/774
3,455,473  7/1969  Gentry ............................. 198/774

FOREIGN PATENT DOCUMENTS 1416332 12/1975 United Kingdom ............... 198/774

Primary Examiner—James G. Smith
Assistant Examiner—Douglas D. Watts
Attorney, Agent, or Firm—Karl F. Ross; Herbert Dubno

[57] ABSTRACT

A walking-beam conveyor has a pair of horizontally and longitudinally extending fixed beams flanking a central movable beam. A plurality of support yokes each have a relatively low central part underneath the movable beam and a pair of relatively high side parts horizontally flanking the movable beam. Rollers are provided on the low parts for supporting the movable beam thereon for longitudinal movement relative to the fixed beams and yokes, the yokes in turn being longitudinally nondisplaceable relative to the fixed beams. Respective vertically expansible lifters are engaged between the ground and the high parts for lifting the movable beam with the yokes relative to the fixed beam. A longitudinal conveyor is hung on the movable beam and has a pinion meshing with a rack carried directly on the movable beam for horizontal displacement of the movable beam relative to the fixed beams.

8 Claims, 6 Drawing Figures

WALKING-BEAM CONVEYOR

FIELD OF THE INVENTION

The present invention relates to a walking-beam conveyor. More particularly this invention concerns such a conveyor used in a steel mill or the like for conveying large and extremely heavy workpieces horizontally.

BACKGROUND OF THE INVENTION

A walking-beam conveyor comprises a pair of fixed and parallel side beams flanking a central movable beam that can be reciprocated both vertically and horizontally. A workpiece can rest on the fixed beams, but be lifted from them by the movable beam as it moves from a lower position below the fixed beams to an upper position above these fixed beams. When the workpiece is resting wholly on the movable beam in the raised position thereof, this movable beam can be stepped horizontally forwardly to displace the workpiece horizontally whereupon the movable beam drops back down below the fixed beams to redeposit the workpiece on the fixed beams. The movable beam can then move, while remaining in the lower position, back to its starting position for another lift-advance and drop-retract cycle. In this manner it is possible to move extremely heavy and bulky objects along a horizontal path with relative ease. Such a system is particularly useful in a steel mill or the like where the workpieces to be moved about are very heavy but not fragile. The instant invention is particularly aimed at a system for conveying coils of sheet metal from place to place.

Most such arrangements use separate drives for vertical and horizontal reciprocation of the movable beam. To this end short hydraulic lifters or rams are provided at intervals along the movable beam, and engage the underside of the movable beam via rollers that are spaced vertically between the lifters and the movable beam. Thus these lifters can raise and lower the rollers on which the movable beam is longitudinally displaceable. Furthermore a longitudinal-displacement motor is provided on a vertically displaceable head carried by the lifters and engages a rack on the underside of the movable beam for horizontally displacing it. It is also known to connect the movable beam by means of a link pivoted at both ends to a horizontally expansible cylinder mounted underneath the assembly and vertically nondisplaceable.

Such arrangements have the considerable disadvantage that it is necessary to make a relatively deep foundation underneath the conveyor, as such a walking-beam conveyor is normally mounted flush with the floor. It therefore becomes necessary to form a relatively deep trench with the foundation to house the relatively tall structure that serves to horizontally and vertically displace the movable beam. Even in systems such as described in my above-cited copending application Ser. No. 007,608 filed Jan. 29 1979 the overall height of the conveyor is relatively great. This is extremely disadvantageous when ground conditions do not permit such a deep foundation to be installed. In any case such a conveyor becomes very expensive to install.

OBJECTS OF THE INVENTION

It is therefore an object of the present invention to provide an improved walking-beam conveyor.

Another object is to provide such a conveyor which can be installed at substantially lower cost than the hitherto known conveyors.

A further object is to provide such a conveyor which is relatively simple in construction and easy to service.

SUMMARY OF THE INVENTION

These objects are attained according to the instant invention in a walking-beam conveyor wherein the movable beam is carried on support yokes each having a relatively low central part underneath the movable beam and a pair of relatively high side parts horizontally flanking the movable beam. Rollers on the lower parts support the movable beam thereon for longitudinal movement relative to the fixed beams and yokes. These yokes are longitudinally nondisplaceable relative to the fixed beams. Respective vertically extensible lifters, normally short hydraulic rams, are engaged between the ground and the high side parts of the yokes for lifting the movable beam with the yokes relative to the fixed beams.

Thus with the system according to the instant invention the overall depth at each of the yokes is not the sum of the height of the lifters plus the rollers plus the movable beam, but can be substantially less as the lifters are provided to the side of the rollers. This does, admittedly, make the system somewhat wider than the prior-art systems. It has been found that construction costs are nonetheless substantially less than in the prior-art systems.

According to further features of this invention the movable beam is provided on its other side with two parallel and longitudinally extending rails. Each yoke has two lower rollers on which the rails ride, that is on which they bear vertically downwardly and two upper rollers that bear downwardly on the respective rails. This arrangement therefore locks the yoke vertically to the movable beam. According to further features of this invention each of the lifters has an upper end provided with a swivel connected to the respective high part of the respective yoke and a lower end that is fixed on the ground. Thus each of these yokes can rock limitedly on the respective pair of swivels so as to remain perfectly aligned with the movable beam. The system therefore can readily compensate for deflection and deformation due to bending under loads.

According to yet another feature of this invention the means longitudinally reciprocating the movable beam includes a housing that is suspended by rollers from the movable beam and that carries a motor whose output shaft has a pinion that meshes with the rack on the other side of the movable beam. Means is provided in the form of fixed abutments for preventing this housing and motor that are hung from the movable beam from moving longitudinally. Thus when the motor output shaft rotates the movable beam will be displaced horizontally. In this arrangement also even as the movable bean is bent or deflected under load the pinion and rack will remain in perfect mesh. Furthermore the drive will operate just as well with the movable beam in the raise position as well as in the slower position.

Each of the yokes is provided according to this invention with a separate hydraulic power unit that is mounted immediately adjacent it under the ground. Thus the system according to the instant invention can be built relatively easily and can be added to without difficulty. In the event that one of the hydraulic power units breaks down, it can easily be serviced or replaced, and only the control lines and cables need run from the one unit to the other, thereby eliminating the need for extensive high-pressure hydraulic lines under the ground.

The system according to the instant invention can therefore be built at relatively low cost and can be counted on to have a long service life. In fact the arrangement can be constituted as a component-type system, so that one need merely link together a plurality of sections of movable and fixed beams, each provided with its own respective lifters and support yokes.

SPECIFIC DESCRIPTION

Figure 1:
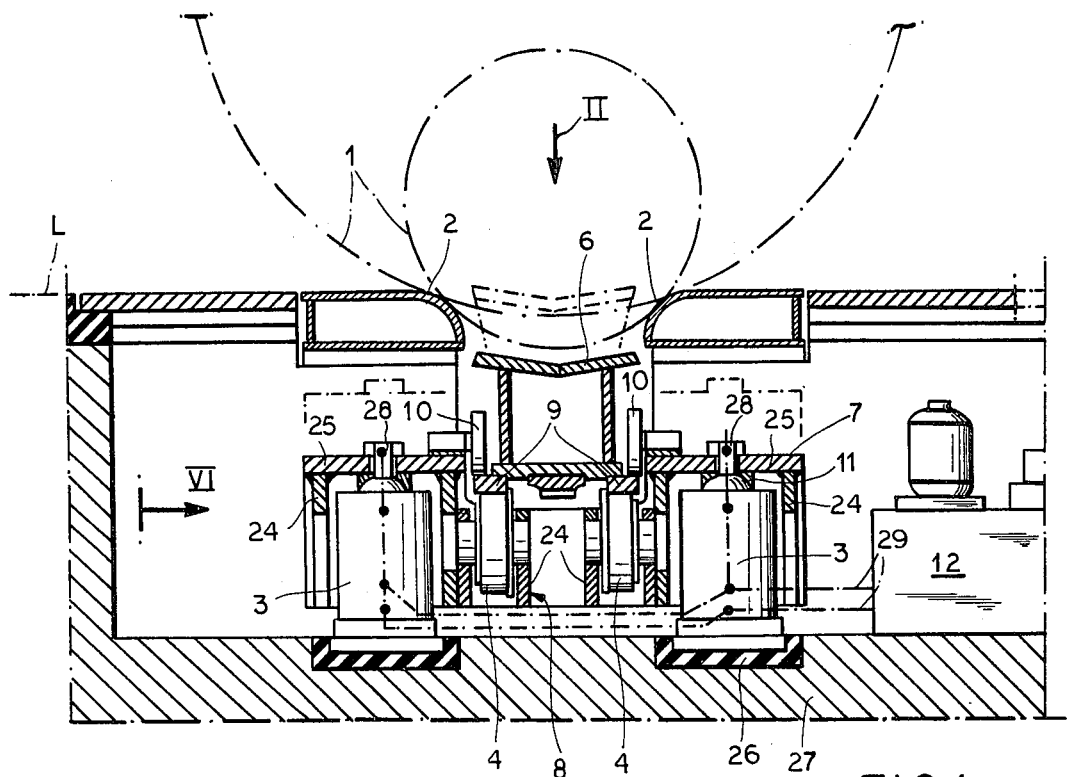
FIG. 1 is a transverse section to the conveyor according to this invention.
Figure 2:
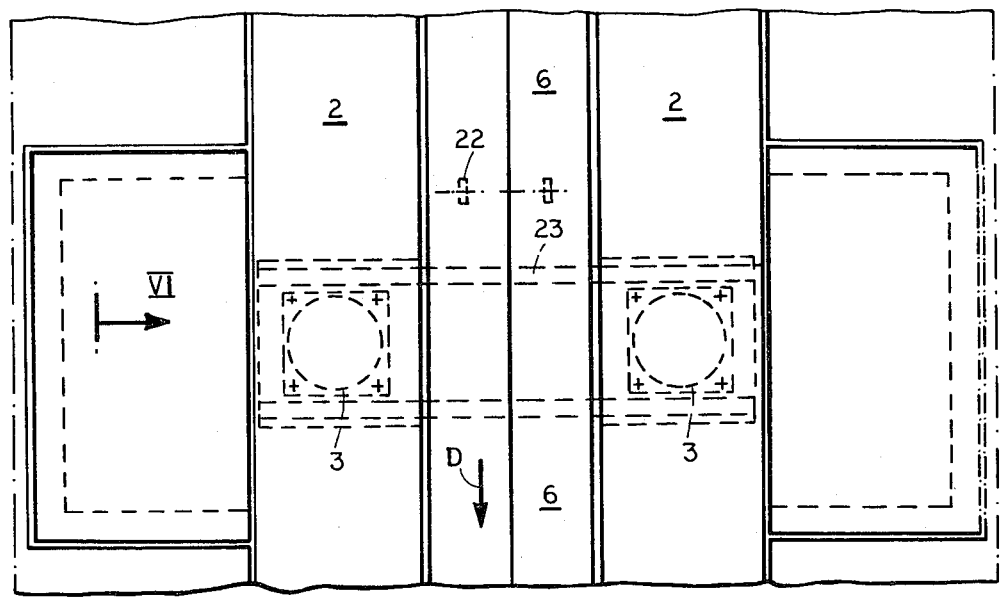
FIG. 2 is a top view taken in the direction of arrow II of FIG. 1.
Figure 6:
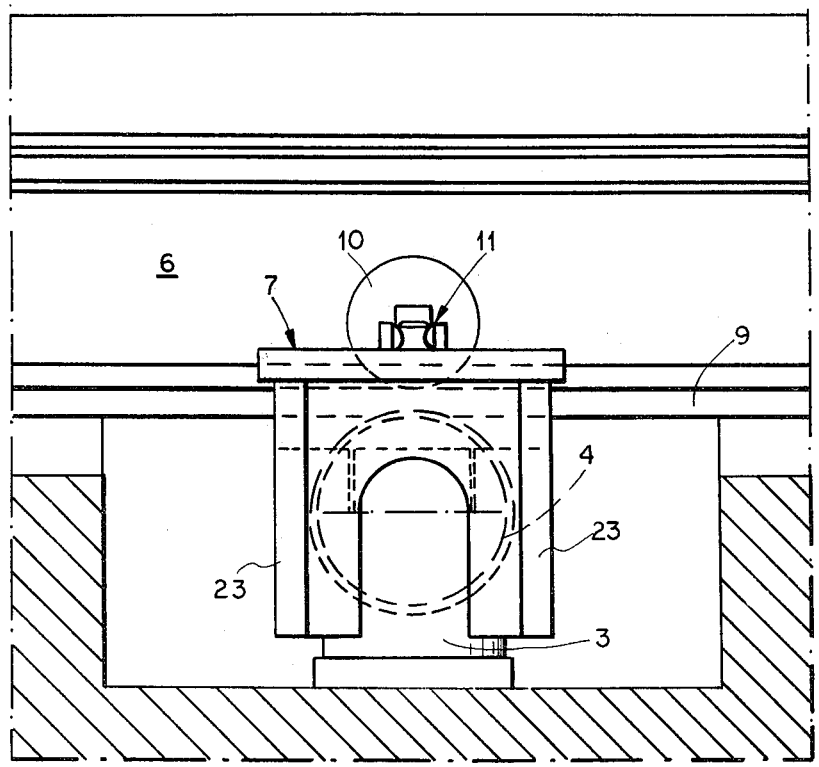
FIG. 6 is an end view taken in the direction of arrow VI of FIGS. 1 and 2.

As seen in FIGS. 1, 2 and 6 a walking-beam conveyor according to the present invention for transporting workpieces 1 such as coils of sheet metal has a pair of fixed and parallel beams 2 defining a level L substantially flush with the ground. Provided between these beams 2 is a central vertically and longitudinally displaceable beam 6 that can be displaced between the lower solid-line position of FIG. 1 below the level L to an upper dot-dash line position above the level L. Normally a plurality of such central beams 6 are connected longitudinally together at their ends as illustrated at 22 in FIG. 2, and each such movable beam 6 is carried on at least two yokes 7 in turn each supported on a pair of hydraulic rams or lifters 3.

Each of these yokes 7 has a pair of side plates 23 extending parallel to each other and perpendicular to the longitudinal direction D along which extend the beams 2 and 6. These plates 23 extend transversely across underneath the beam 6 and are bridged by transverse webs 24 extending in the direction D and welded to both the plates 23 so as to lock them rigidly together. In addition a pair of top plates 25 welded both to the side plates 23 and to the respective outer two webs 24 form a rigid assembly of the yokes 7, constituted generally as a box beam extending transversely across underneath the beam 6.

The rams 3 are seated underneath the projecting ends at the plates 25 of the yokes 7 in elastomer sockets 26 set in the concrete foundation 27 of the assembly. The upper ends of the piston rods 28 of these rams 3 are received loosely in downwardly open sockets 11 forming swivel joints so that the yokes 7 will be self-centering on top of the rams 3.

Journaled in the transverse webs 24 underneath the beam 6 in each yoke 7 is a pair of rollers 4 of relatively large diameter. The beam 6 carries a pair of longitudinal rails 9 that ride on their undersides on the rollers 4 and that are engaged in their upper sides by further holddown rollers 10 mounted on the top plates 25 of the yokes 7. The rollers 4 are flanged like railroad-car wheels to maintain the beam 6 centered between the beams 2. Thus the beam 6 can move longitudinally relative to the yokes 7, but cannot move vertically independently of it.

The rams 3 of each yoke 7 are connected via hydraulic lines 29 to a respective hydraulic pump and drive unit 12. Thus each yoke 7 has its own unit that is recessed underneath the ground or floor level L next to itself. The only connections needed between adjacent hydraulic drive units 12 are the power cable and control line. Furthermore in the event of failure of anyone of these units it is a relatively simple job to open up the respective cover and repair this relatively small hydraulic drive unit.

Thus each of the lifting arrangements is relatively short as each yoke 7 has the relatively tall side part containing a hydraulic ram 3, but underneath the beams 6 only has a relatively short central part 8 carrying the rollers 4. The considerable height of the prior-art systems with the rollers 4 above the lifters is therefore avoided for substantially cheaper installation costs.

Figure 3:
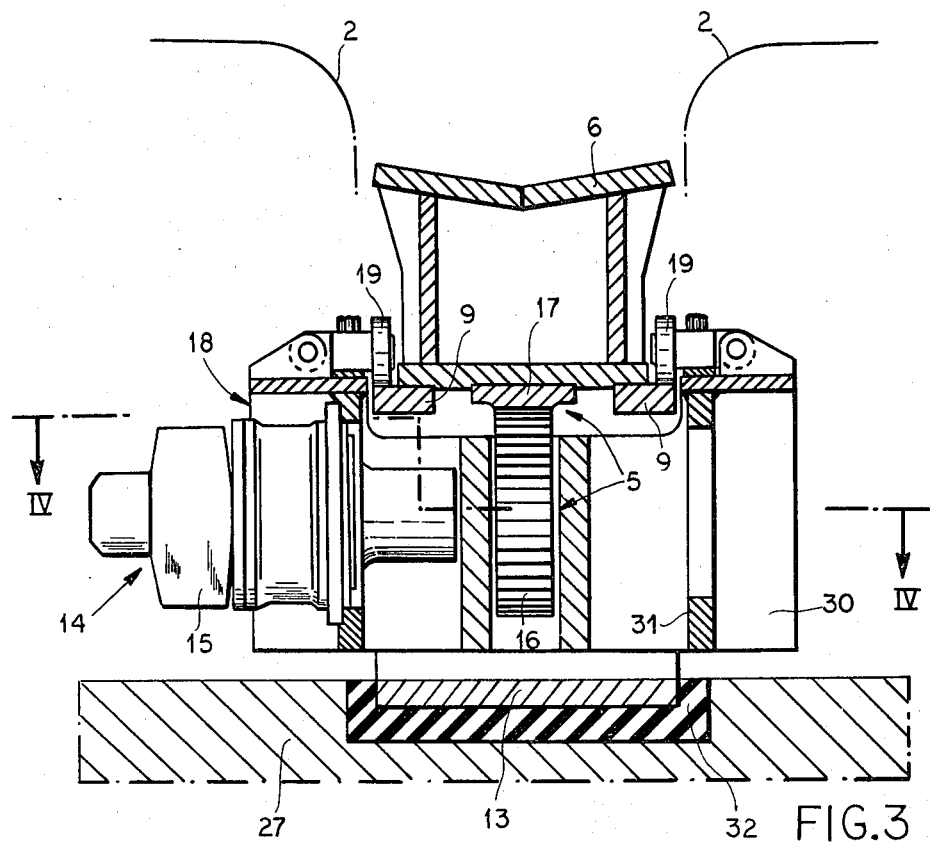
FIG. 3 is another transverse section through the apparatus according to this invention.
Figure 4:
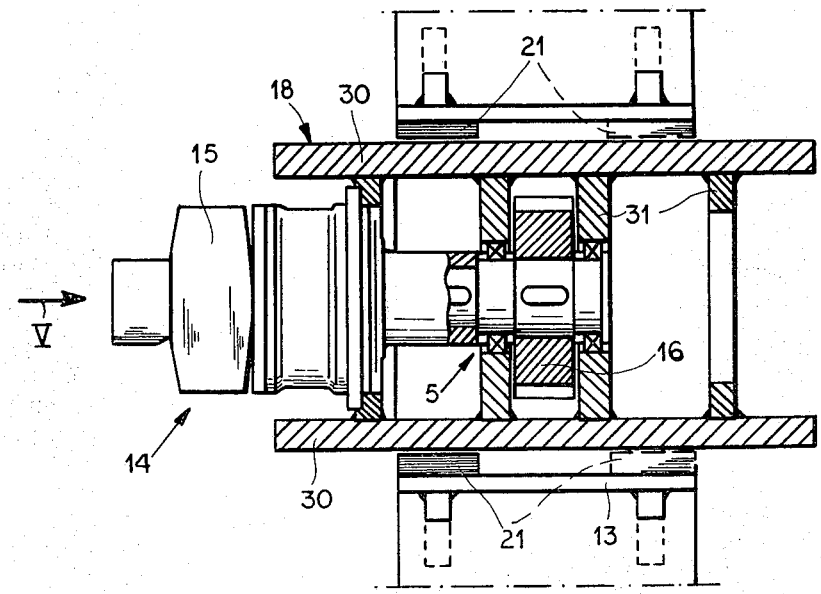
FIG. 4 is a section taken along line IV—IV of FIG. 3.
Figure 5:
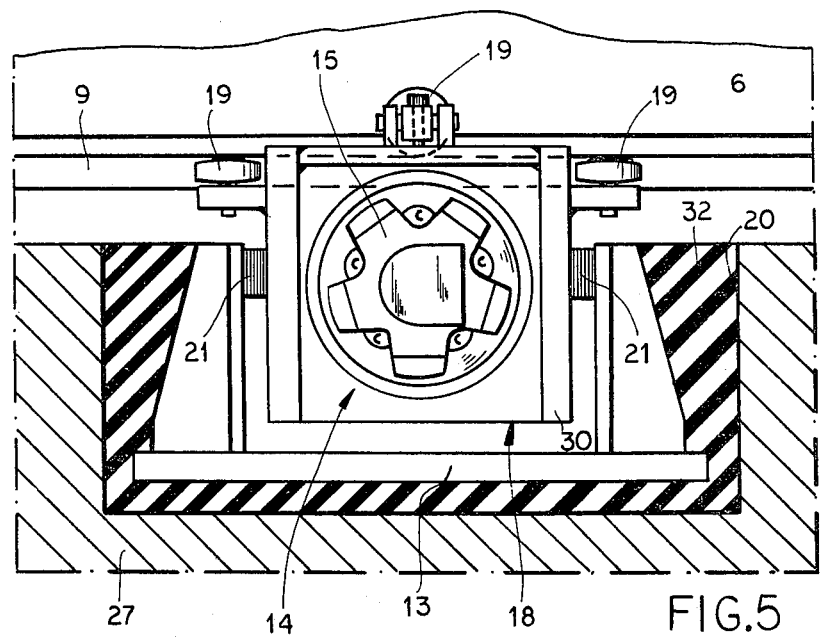
FIG. 5 is a partly sectional end view taken in the direction of arrow V of FIG. 4.

In addition as shown in FIGS. 3-5 each of the longitudinal beams 6 is displaceable longitudinally relative to the fixed beams 2 by a respective longitudinal drive unit 14 connected via a rack and pinion assembly 5 to the beam 6. Each such drive 14 has a cage-type housing 18 constituted by a pair of rigid end plates 30 bridged by webs 31 and hung by means of rollers 19 on the rails 9 of the beam 6. A hydraulic motor 14 drives a pinion 16 meshing with a rack 17 carried on the underside of the beam 6 between the rails 9. Since the housing 18 is hung on the beam 6 the pinion 16 and the rack 17 of the assembly 5 will always remain in perfect mesh, even as the beam 6 is vertically reciprocated by the lifters 3.

Furthermore, as best seen in FIG. 5, the foundation 27 is formed underneath the beam 6 at each of the longitudinal drives 14 with a pit 20 lined with elastomeric material 32 and holding a metallic frame 13 provided with bumpers 21 engageable with the end plate 30 of the housing 18 in the longitudinal direction D.

In use the longitudinal drive 14 and lifters 3 operate synchronously. A workpiece such as a spool of sheet metal 1 supported on the two fixed beams 2 in the lower position of the movable beams 6 is raised off these beams 2 as the lifters 3 extend upward. When fully raised the drive 14 operates to longitudinally displace the movable beam 6 in a full step, after which the cylinders 3 retract to set the workpiece 1 back down on the fixed beam 2. Thereupon the drive 14 reverses so as to return the movable beam 6 in the lower position and out of contact with the workpiece 1 back one full step in the upstream direction. The cycle can then be repeated.

The system according to the instant invention can be installed relatively easily, without having to make a deep foundation in the floor underneath the walking-beam conveyor. The overall depth of the foundation and pits needed for the lifters 3 and yokes 7 is only approximately half as deep as that in the prior-art system, due to the use of lifters 3 that flank the fixed beam 6. Furthermore the use of a longitudinal drive 14 that hangs directly on the movable beams 6 but that is prevented from moving longitudinally relative thereto ensures perfect meshing of the gear 16 and rack 17, even if the beam 6 is bent from a perfectly straight position by a very heavy load.

I claim:

1. A walking beam conveyor comprising:
   a pair of horizontally and longitudinally extending and parallel fixed side beams;

a central movable beam between and parallel to said fixed beams;

a plurality of support yokes each having a relatively low central part underneath said movable beam and a pair of relatively high side parts horizontally flanking said movable beam;

respective rollers on said low parts supporting said movable beam thereon for longitudinal movement relative to said fixed beams and yokes, said yokes being longitudinally nondisplaceable relative to said fixed beams;

respective vertically expansible lifters engaged between the ground and said high side parts for lifting said movable beam with said yoke relative to said fixed beams, said rollers and yokes lying horizontally at least partially between the respective lifters; and means for longitudinally reciprocating said movable beam relative to said fixed beams, the reciprocating means including:

a housing suspended from said movable beam, means for preventing said housing from moving longitudinally relative to said fixed beams, a rack mounted on and extending longitudinally along said movable beam, a pinion mounted on said housing and in mesh with said rack, and a motor carrying said pinion and mounted in said housing.

2. The conveyor defined in claim 1 wherein said movable beam is provided with two parallel and longitudinally extending rails, each such yoke having two such lower rollers on which the respective rails ride.

3. The conveyor defined in claim 2 wherein each such yoke has two upper rollers bearing downwardly on the respective rails of said movable beam.

4. The conveyor defined in claim 1 wherein each of said lifters has an upper end provided with a swivel connected to the respective high part, and a lower end fixed to the ground.

5. The conveyor defined in claim 1 wherein said lifters are vertically expansible hydraulic rams, said conveyor further comprising for each of said yokes means including a hydraulic power unit for hydraulically pressurizing the respective lifters.

6. A walking-beam conveyor comprising:

a pair of horizontally and longitudinally extending and parallel fixed beams;

a central movable beam between and parallel to said fixed beams;

means for vertically reciprocating said movable beam;

a housing suspended from said movable beam;

means for preventing said housing from moving longitudinally relative to said fixed beams;

a rack mounted on and extending longitudinally along said movable beam;

a pinion mounted on said housing and in mesh with said rack; and a motor carrying said pinion and mounted on said housing.

7. The conveyor defined in claim 6 wherein said housing is provided with rollers bearing horizontally and downwardly on said movable beam.

8. The conveyor defined in claim 6 wherein said means for preventing includes a transversely extending abutment fixed relative to said fixed beams and engageable with said housing.

* * * * *